United States Patent

Craft

(10) Patent No.: US 8,886,900 B2
(45) Date of Patent: Nov. 11, 2014

(54) LEGACY DATA MANAGEMENT

(75) Inventor: David J. Craft, Wimberly, TX (US)

(73) Assignee: International Business Machines Corporation, Armonk, NY (US)

( * ) Notice: Subject to any disclaimer, the term of this patent is extended or adjusted under 35 U.S.C. 154(b) by 867 days.

(21) Appl. No.: 12/951,136

(22) Filed: Nov. 22, 2010

(65) Prior Publication Data

US 2012/0131274 A1     May 24, 2012

(51) Int. Cl.
*G06F 12/00*     (2006.01)
*G06F 3/06*     (2006.01)
*G06F 17/30*     (2006.01)
*G06F 13/00*     (2006.01)
*G06F 13/28*     (2006.01)

(52) U.S. Cl.
CPC ............ *G06F 3/0607* (2013.01); *G06F 3/0638* (2013.01); *G06F 17/30221* (2013.01); *G06F 3/067* (2013.01)
USPC ........... 711/161; 711/162; 711/200; 711/220; 711/114; 707/649; 707/651

(58) Field of Classification Search
CPC ..... G06F 3/0638; G06F 3/067; G06F 3/0607; G06F 17/30221
USPC .......... 711/114, 161, 162, 220, 200; 707/649, 707/651
See application file for complete search history.

(56) References Cited

U.S. PATENT DOCUMENTS

| | | | |
|---|---|---|---|
| 5,680,640 A * | 10/1997 | Ofek et al. | 710/19 |
| 7,363,457 B1 * | 4/2008 | Dekoning et al. | 711/170 |
| 7,483,875 B2 * | 1/2009 | McKay et al. | 1/1 |
| 2005/0108237 A1 * | 5/2005 | Sonoda et al. | 707/9 |
| 2006/0143419 A1 | 6/2006 | Tulyani | |
| 2008/0168228 A1 | 7/2008 | Carr et al. | |
| 2009/0249005 A1 | 10/2009 | Bender et al. | |
| 2010/0106990 A1 | 4/2010 | Kalman | |
| 2010/0131467 A1 | 5/2010 | Prahlad et al. | |

* cited by examiner

*Primary Examiner* — Stephen Elmore
*Assistant Examiner* — Mark Giardino, Jr.
(74) *Attorney, Agent, or Firm* — James L. Baudino

(57) ABSTRACT

Various systems, processes, products, and techniques may be used to manage legacy data. In one general implementation, a system, process, and/or product for managing legacy data may include the ability to determine whether a data request has been received and, if a data request has been received, determine whether the data request is associated with legacy data of an external storage management system. If the data request is not associated with legacy data of an external storage management system, the system, process, and/or product may retrieve data from a local storage array, and if the data request is associated with legacy data of an external storage management system, the system, process, and/or product may request legacy data from an external storage management system. The system, process, and/or product may also generate a response to the data request.

19 Claims, 5 Drawing Sheets

LEGACY DATA MANAGEMENT

BACKGROUND

The present invention relates to data, and more specifically to managing data.

With the introduction of new storage management solutions into a computer system environment, the continued use of data created within pre-existing storage management solutions must typically be maintained. This continued use of pre-existing data is usually handled in one of three ways: 1) maintaining the pre-existing storage management solution side by side with the new storage management solution; 2) dumping the pre-existing data to some raw format media (e.g., tape) and re-importing the data into the new storage management solution; or 3) ensuring that the new storage management solution is upwardly compatible and merely adds-on to the pre-existing storage management solution.

BRIEF SUMMARY

In one implementation, a process for managing legacy data may include receiving a data request at a storage controller and determining whether the data request is associated with legacy data of an external storage management system. The process may also include retrieving data from a local storage array if the data request is not associated with legacy data of an external storage management system and requesting legacy data from an external storage management system if the data request is associated with data of an external storage management system. Additionally, the process may include generating a response to the data request. The process may be executed by various systems and computer program products.

DETAILED DESCRIPTION

Figure 1:
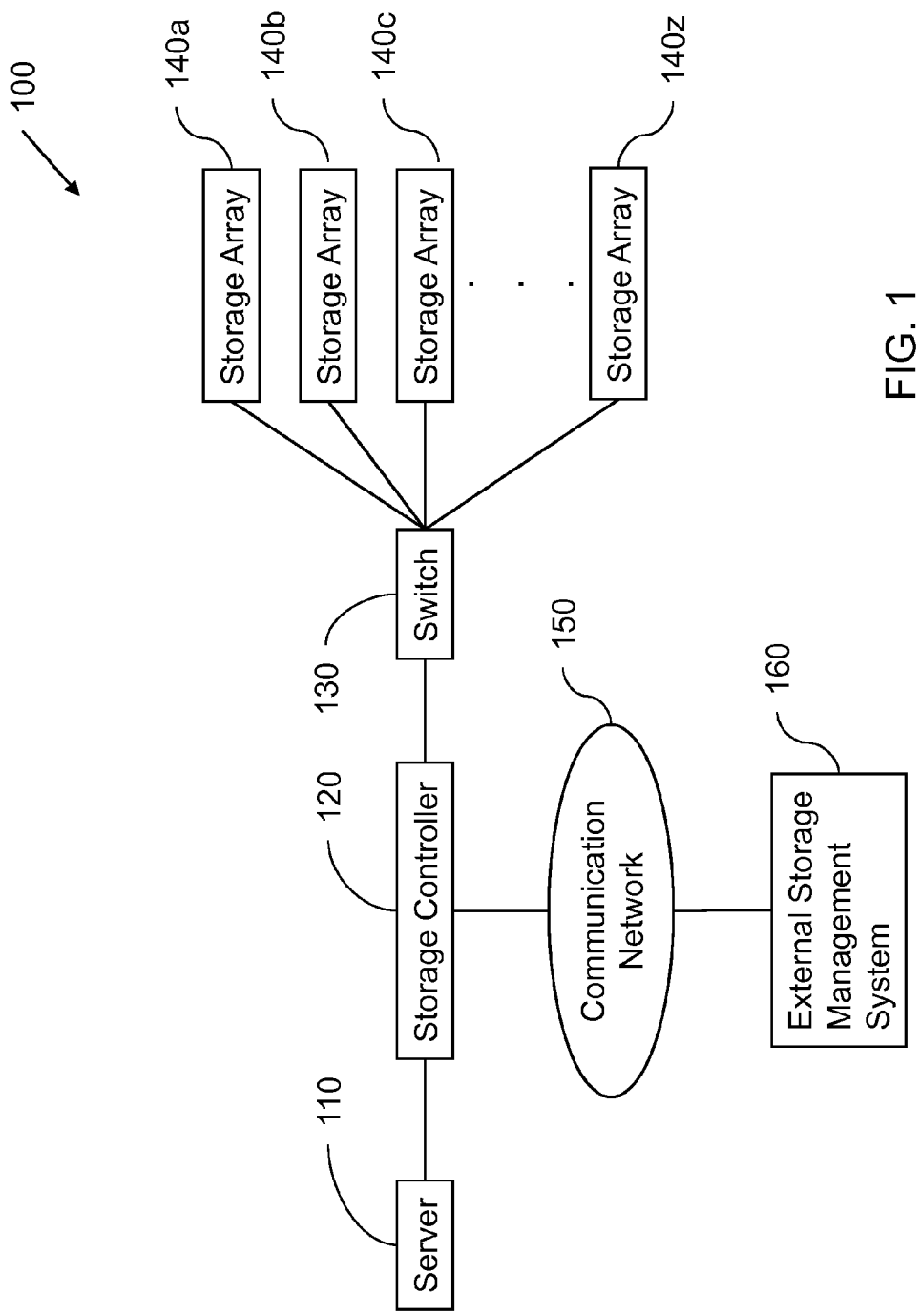
FIG. 1 is a block diagram illustrating an example system for managing legacy data.

Legacy data may be managed by various techniques. In one general implementation, a storage controller may determine whether a data request is associated with legacy data of an external storage management system. If the data request is not associated with legacy data of an external storage management system, the storage controller may retrieve data from a local storage array, and if the data request is associated with legacy data of an external storage management system, the storage controller may request legacy data from the external storage management system. Techniques for incrementally migrating the legacy data into the storage local storage array are also possible.

As will be appreciated by one skilled in the art, aspects of the present disclosure may be implemented as a system, method, or computer program product. Accordingly, aspects of the present disclosure may take the form of an entirely hardware environment, an entirely software embodiment (including firmware, resident software, micro-code, etc.), or an implementation combining software and hardware aspects that may all generally be referred to herein as a "circuit," "module," or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of a computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this disclosure, a computer readable storage medium may be a tangible medium that can contain or store a program for use by or in connection with an instruction execution system, apparatus, or device.

A computer readable signal medium may include a propagated data signal with computer readable program code embodied therein, for example in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any medium, including but not limited to wireless, wireline, optical fiber cable, RF, etc. or any suitable combination of the foregoing.

Computer program code for carrying out operations for aspects of the disclosure may be written in any combination of one or more programming languages such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the disclosure are described below with reference to flowchart illustrations and/or block diagrams of methods, apparatus (systems), and computer program products according to implementations. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other device to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions that execute on the computer or other programmable apparatus provide processes for implementing the functions/acts specified in the flowchart and/or block diagram block or blocks.

FIG. 1 illustrates an example system 100 for managing legacy data. In general, system 100 includes a server 110 that issues data requests (e.g., read, write, etc.) and a storage controller 120 that responds to the server's requests.

Server 110 may generally be any type of device for delivering data to clients. For example, server 110 may be an IBM DB2 server, an IBM Websphere server, or a Linux server. Server 110 may send and receive data according to any appropriate protocol (e.g., TCP/IP, Ethernet, IEEE 802.11, etc.).

In operation, server 110 may require data from various external sources, and storage controller 120 may operate as one of the sources. Thus, storage controller 120 is responsible for receiving data requests (e.g., block or file) from server 110, finding the appropriate data, and sending it to the server. Server 110 and storage controller 120 may be coupled by any appropriate technique (e.g., cable, optical fiber, or wireless), and server 110 may access storage controller 120 through any appropriate interface protocol (e.g., NFS, vSCSI or iSCSI).

In this implementation, storage controller 120 is coupled to switch 130, which provides access to a number of storage arrays 140. Together, storage controller 120, switch 130, and storage arrays 140 may define a storage management system. Storage controller 120 and switch 130 may be coupled by any appropriate technique (e.g., cable or optical fiber). Each storage array 140 may, for example, include a power supply and a number of drives, which may, for example, operate by optical, electro-magnetic, solid-state, and/or other appropriate techniques. The storage arrays may store data independently of each other or in a redundant manner (e.g., redundant array of independent disks).

Storage controller 120 is also coupled to a communication network 150, which provides access to an external storage management system 160. External storage management system 160 may include a storage device or a number of storage devices (e.g., an array). External storage management system 160 is typically of a different brand (e.g., EMC v. IBM) and/or type than storage controller 120 and/or storage arrays 140 and may, for example, be a legacy storage system. Communication network 150 may, for example, be a wide area network or the Internet.

Because of differences between external storage management system 160 and storage arrays 140, storage controller 120 understands how to request data from external storage management system 160. To accomplish this, storage controller 120 may store meta-data regarding the data on external storage management system 160. The meta-data may describe the protocol for accessing the external storage management system through communication network 150 as well as the protocol for retrieving the data. For instance, data could be presented in the storage controller via a location address (e.g., Network Attached Storage (NAS) file system path) and an access methodology (e.g., read( )). A variety of other forms of addresses (e.g., a world wide web address) and portions of access protocols (e.g., opening a socket connection) could also be specified. Moreover, a variety of other retrieval protocols (e.g., Hypertext Transfer Protocol (HTTP), Network File Storage (NFS), Server Message Block (SMB), Apple Filing Protocol (AFP), Amazon Simple Storage Service (Amazon S3), and Structured Query Langage (SQL)) could be used. Additionally, the meta-data may describe any data sub-unit addressability requirements.

An example meta-data statement is:
http://www.abc.com/
   <filer_service_provider>?f=<file_name>d=<data_off
   set>u=<data_unit_size>.

This statement may, for example, retrieve a 4K data unit starting at offset 0 from the file name "mydata" and filer service provider "mystorage.fsp" from www.abc.com if given the following request http://www.abc.com/mystorage.fsp?f=mydatad=0u=4096.

In operation, storage controller 120 may present one logical unit number (LUN) to server 110 for all of the storage systems to which the storage controller is coupled. However, storage controller 120 may have a number of different LUNs that it uses internally to reference the various groupings and/or partitions of storage systems, including the external storage management system 160.

In particular implementations, a storage controller may use characteristics of a virtual server storage. Virtual server storage implementations are available from various companies, including International Business Machines of Armonk, N.Y. (e.g., PowerVM Virtual I/O Server (VIOS)) and VMware of Palo, Alto, Calif. The virtual server storage may be a combination clustered file system and storage pool system in which LUNs enter a storage pool and the aggregate content of the storage system is presented as available space to the file system. Objects within the virtual server storage (e.g., files) running on the server may be then exported from the server to logical partitions (LPARs) via a virtual SCSI interface.

The storage pool of the virtual storage system may be further divided into tiers of storage. For example, a set of solid state drives, which are typically relatively faster, may be grouped together as a "cache" storage tier within the storage pool, and a set of rotational storage disk drives, which are typically relatively slower, may be grouped together as an archival tier. Thus, the storage pool may be composed of multiple storage tiers, and certain data may be placed on certain tiers depending on things like access usage.

A virtual storage system typically has a storage tier in which the meta-data for the storage system is placed. This is typically referred to as the system storage tier, and may in fact hold both meta-data and data if unique storage tiers have not been set up. The other tiers beyond the system storage tier typically contain data only. Thus, the descriptive meta-data may appear, and be on, separate tiers (e.g., drives) from the data for which it is describing the layout.

In these implementations, a storage tier, as opposed to being used as a data container itself, may be used as a description of the access protocol (e.g., address) and the retrieval protocol of the data. For instance, a LUN may have an interface such that when read, it is just a linear progression of data and offsets associated with the data. Thus, the virtual storage system may build a set of meta-data detailing the linear progression of the external data and combine this meta-data under a single file object that appears within the file system, which effectively produces a new access name for the data (the virtual storage server file). And when read thru the virtual storage server, the meta-data address translation allows access to the external data at the offset associated with the meta-data pointer. To some extent, this is as if the storage tier directly contained the data, but the difference is that the access protocol and retrieval protocol of the external data are now no longer the implied standard data LUN retrieval methodology (e.g., devstrat( )) nor the standard data LUN location naming convention (e.g., dev/hdisk1).

Additionally, in certain implementations, the functionality in which files may be presented via SCSI protocol to logical partition clients may be used to present the newly capable file to pre-existing external data translation as a new block device (e.g. LUN) to clients.

System 100 has a variety of features. For example, system 100 allows legacy data to be managed under newer storage management infrastructure without having to migrate the data to the newer infrastructure. For instance, the legacy data does not have to be dumped into a raw format on some intermediate media (e.g., tape) and then imported into the new system, which is typically impractical due to the massive amounts of data involved and the time required to move data between systems. Instead, the data can continue to reside on the same physical media on which it originally resided under the pre-existing storage management solution. Moreover, the time required to build this external accessibility is relatively short (e.g., on the order of a few seconds). Thus, new storage management infrastructure may be readily added to existing storage management infrastructure. As another example, the legacy data may be managed with management capabilities that were previously not possible with the pre-existing storage management infrastructure. In certain implementations, for example, once accesses start occurring through the new storage management pool and through the new meta-data description, advanced capabilities such as snapshots, which present views of the data at the point in time when the snapshot was created, or clones can be applied to the legacy data. This would not be possible if the pre-existing storage solution were simply maintained side-by-side with the new storage management solution. Moreover, this allows the data owner to use product lines from different vendors.

In particular implementations, a storage controller may have a redirect on write (ROW) functionality. Thus, when modifications to the legacy data occur, the writes could be directed to a different tier (e.g., a newer LUN) in the new storage management pool, which basically bounces the legacy data off the pre-existing storage management solution and into a local location within the virtual storage system.

Figure 2:
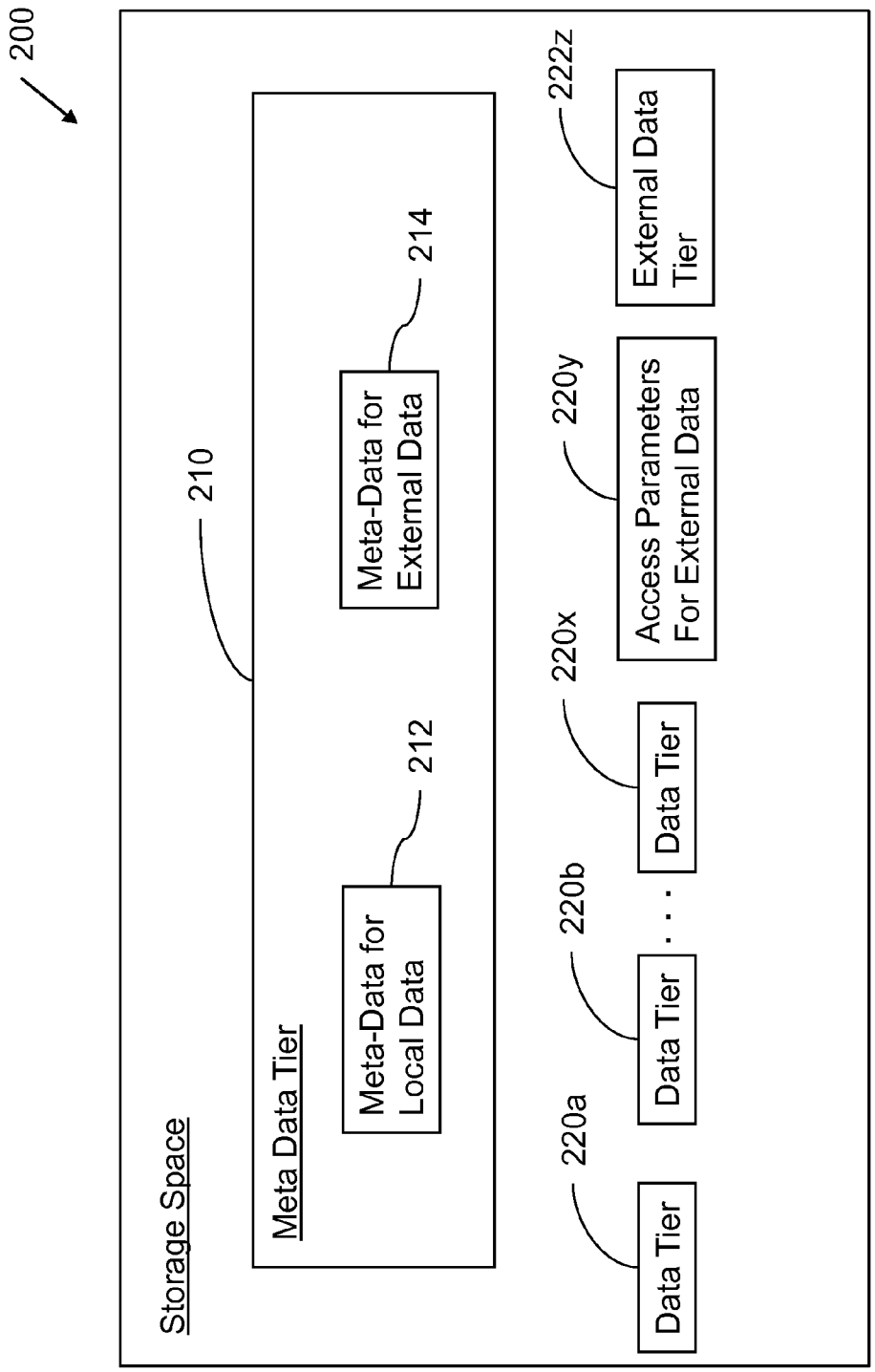
FIG. 2 is a block diagram illustrating an example storage space allocation for certain implementations.

FIG. 2 illustrates an example allocation of storage space 200 for these implementations. As can be seen, storage space 200 includes a meta-data tier 210 for the data that is accessible through the storage controller. In particular, meta-data tier 210 includes meta-data 212 for data that is local to the storage management system and meta-data 214 for data that is external to the storage management system (e.g., the legacy data). The meta-data may, for example, contain pointers (e.g., LUNs) for locating the applicable data.

The data for the local storage management system is stored in data tiers 220a-220x. The data tier also contains the access parameters 220y for the external data and a tier 222z for the external data.

When storage space 200 is first allocated, external data tier 222z may contain no data, as the external data may still reside on the external storage management system. However, as writes to the data of the external storage management system occur, the written data may be stored in external data tier 222z. Thus, as writes occur, data for the external storage management system data may be placed in storage space 200, which may allow data from the external storage management system to be migrated over time to storage space 200.

In certain implementations, the migration may be accomplished with the assistance of a snapshot functionality, which basically provides persistent versions of data. For instance, snapshots may be created such that subsequent modifications do not modify the snapshot but instead move the updated block to a new location and allow the leading edge view of the data (not the snapshot) to contain: 1) meta-data pointers to the unmodified data (also available in the prior snapshot); and 2) meta-data pointers to the new modified data (modified data now disjoint from the prior snapshot). The existing data may therefore be effectively migrated in an incremental manner to the storage management solution's newer physical media.

Although FIG. 2 illustrates one implementation of a storage space allocation, other implementations could have other allocations. For example, in certain implementations, the written data could be bounced to a remote data storage system (e.g., in the Internet).

In particular implementations, the storage controller may be implemented as a file system within a server such as server 110. Thus, the access mechanism could go directly from the server into the storage controller (e.g., via a read/write system call). This could also make the access into the storage pool more direct, as opposed to being redirected thru an external storage controller.

Figure 3:
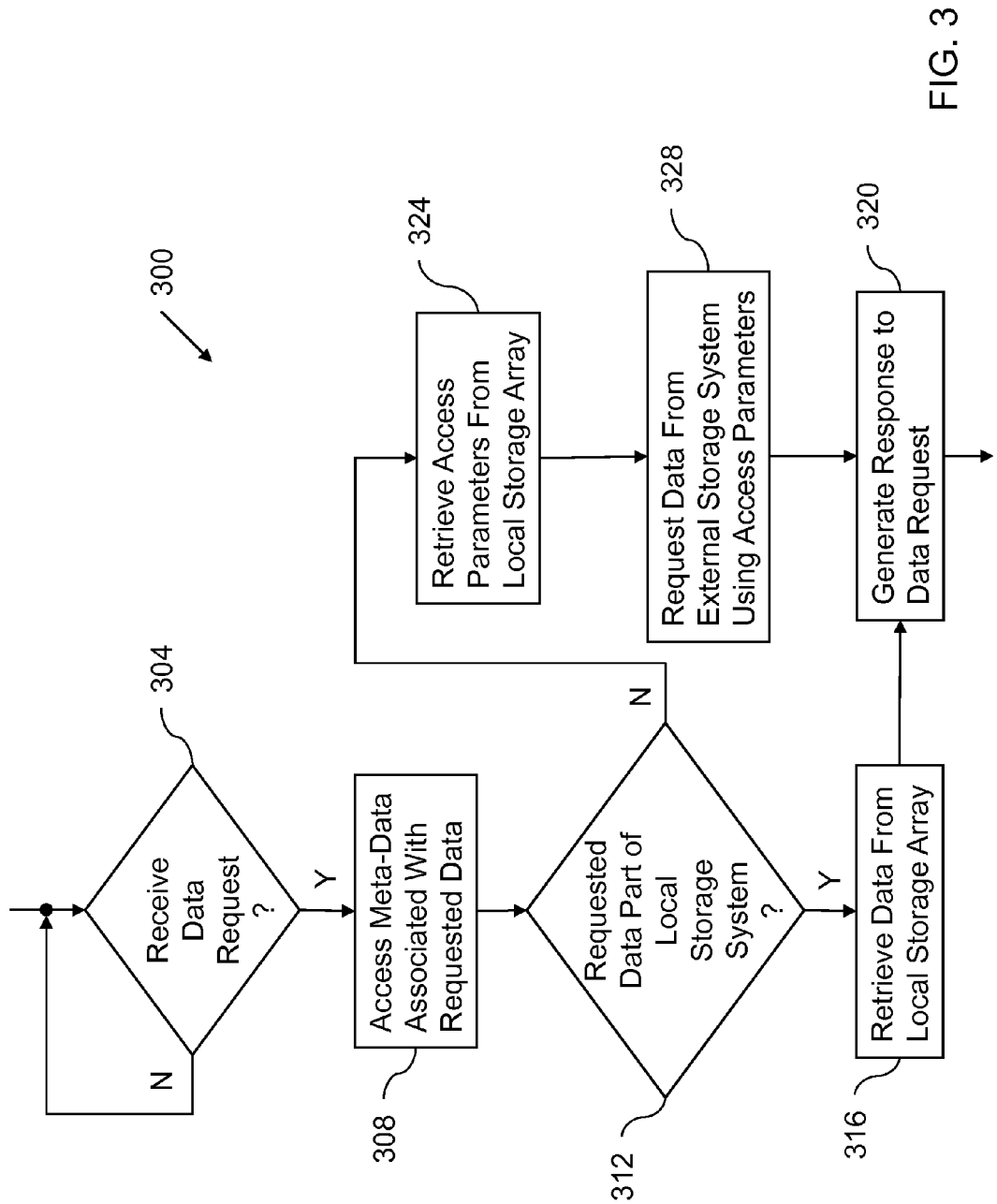
FIG. 3 is a flowchart illustrating an example process for managing legacy data.

FIG. 3 illustrates an example process 300 for managing legacy data. Process 300 may, for example, be implemented by a storage controller similar to storage controller 120.

Process 300 begins with determining whether a data request has been received (operation 304). A data request may, for example, have been sent from a server and may be for a data block or file. If a data request has not been received, process 300 calls for continuing to check for a data request.

Once a data request has been received, process 300 calls for accessing meta-data associated with the requested data (operation 308). The meta-data may, for example, be stored in a storage array and contain information regarding the requested data.

Process 300 also calls for determining if the requested data is part of the local storage management system (operation 312). If the requested data is part of the local storage management system, process 300 calls for retrieving the data from a local storage array (operation 316) and generating a response to the data request (operation 320). The data may, for example, be retrieved by using a device identifier and a read request. The generated response may be sent to the requesting server.

If the requested data is not part of the local storage system, process 300 calls for retrieving data access parameters from the local storage array (operation 324) and retrieving the requested data from an external storage management system using the access parameters (operation 328). The access parameters may, for example, indicate the protocol for accessing the external storage management system through a communication network (e.g., network address) as well as the protocol for retrieving the data (e.g., SQL). Process 300 also calls for generating a response to the data request (operation 320).

Figure 4:
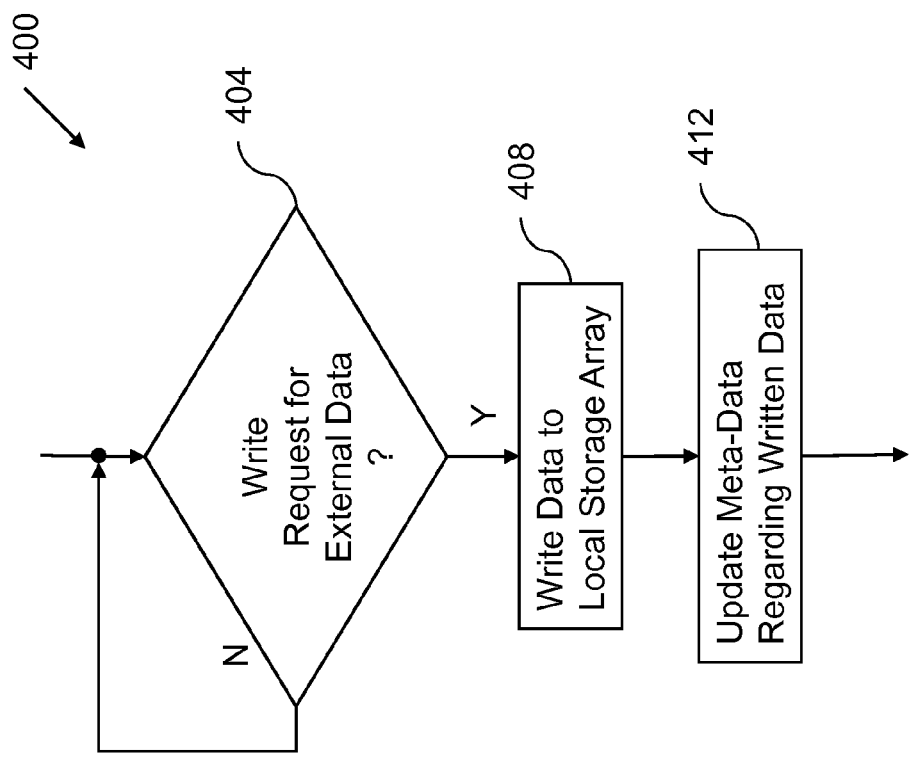
FIG. 4 if a flowchart illustrating another example process for managing legacy data.

FIG. 4 illustrates another example process 300 for managing legacy data. Process 400 may, for example, be implemented by a storage controller similar to storage controller 120.

Process 400 begins with determining whether a write request associated with data external to the storage management system has been received (operation 404). Determining whether a write request is associated with external data may, for example, be accomplished by determining an identifier (e.g., a LUN) associated with the requested data. If a write request associated with external data has not been received, process 400 calls for waiting for a write request associated with external data.

Once a write request associated with external data has been received, process 400 calls for writing the data to a local storage array (operation 408). The data may, for example, be written to a portion of the storage array that has been partitioned for the external data.

Process 400 also calls for updating meta-data regarding the written data (operation 412). For example, pointers to the written data may be updated to point to the local storage array instead of the external storage management system. Thus, when the data is accessed in the future, it may be read from the local storage array instead of from the external storage management system.

The flowchart and block diagrams in the figures illustrate the architecture, functionality, and operation of systems, methods, and computer program products of various implementations of the disclosure. In this regard, each block in the flowchart or block diagrams may represent a module, segment, or portion of code, which can include one or more executable instructions for implementing the specified logical function(s). It should also be noted that, in some alterative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or the flowchart illustration, and combination of blocks in the block diagrams and/or flowchart illustration, can be implemented by special purpose hardware-based systems the perform the specified function or acts, or combinations of special purpose hardware and computer instructions.

Figure 5:
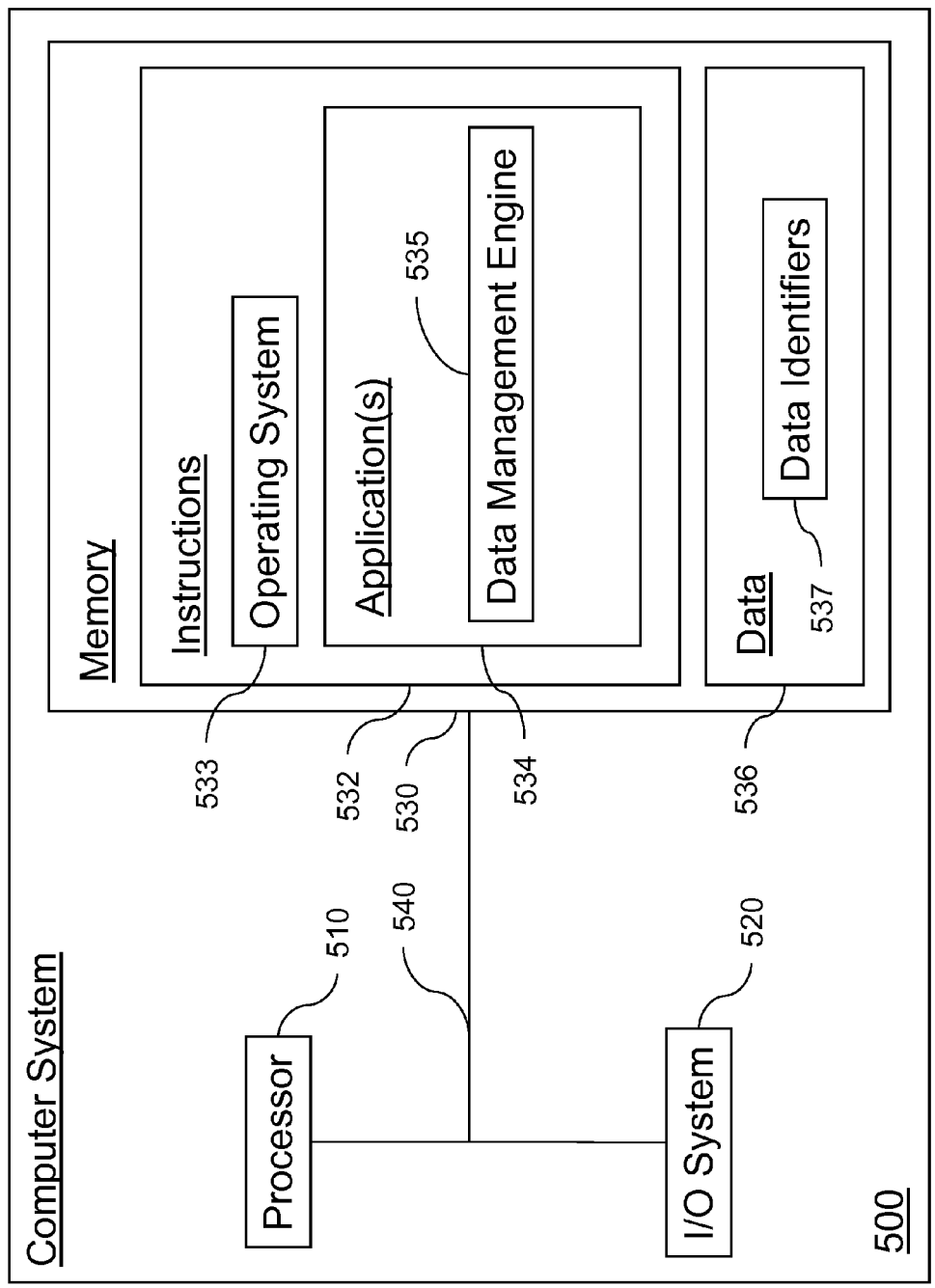
FIG. 5 is a block diagram that illustrates an example computer system for managing legacy data.

FIG. 5 illustrates an example computer system 500 that can manage legacy data. System 500 includes a processor 510, an input/output system 520, and memory 530, which are coupled together by a bus network 540.

Processor 510 may, for example, be a microprocessor, a microcontroller, or an application specific integrated circuit. Moreover, the processor may operate by reduced instruction set computer (RISC) or complex instruction set computer (CISC) principles. In general, processor 510 may be any device that manipulates data in a logical manner.

Input/output system 520 may, for example, include one or more communication interfaces and/or one or more user interfaces. A communication interface may, for instance, be a network interface card (whether wireless or wireless) or a modem. A user interface could, for instance, be a user input device (e.g., a keyboard, a keypad, a touchpad, a stylus, or a microphone) or a user output device (e.g., a monitor, a display, or a speaker). In general, system 520 may be any combination of devices by which a computer system can receive and output data.

Memory 530 may, for example, include random access memory (RAM), read-only memory (ROM), and/or disc memory. Various items may be stored in different portions of the memory at various times. Memory 530, in general, may be any combination of devices for storing data.

Memory 530 includes instructions 532 and data 536. Instructions 532 include an operating system 533 (e.g., Windows, Linux, or Unix) and applications 534, one of which is a data management engine 535. Data management engine 535 is responsible for managing data requests from one or more servers according to the processes described previously. Data 536 includes the data required for applications 534. For instance, data 537 may hold data identifiers (e.g., pointers) for the meta-data for the stored data.

Network system 540 is responsible for communicating data between processor 510, input/output system 520, and memory 530. Network system 540 may, for example, include a number of different types of busses (e.g., serial and parallel).

The terminology used herein is for the purpose of describing particular implementations only and is not intended to be limiting. As used herein, the singular form "a", "an", and "the" are intended to include the plural forms as well, unless the context clearly indicates otherwise. It will be further understood that the terms "comprises" and/or "comprising," when used in the this specification, specify the presence of stated features, integers, steps, operations, elements, and/or components, but do not preclude the presence or addition of one or more other features, integers, steps, operations, elements, components, and/or groups therefore.

The corresponding structure, materials, acts, and equivalents of all means or steps plus function elements in the claims below are intended to include any structure, material, or act for performing the function in combination with other claimed elements as specifically claimed. The description of the present implementations has been presented for purposes of illustration and description, but is not intended to be exhaustive or limited to the implementations in the form disclosed. Many modification and variations will be apparent to those of ordinary skill in the art without departing from the scope and spirit of the disclosure. The implementations were chosen and described in order to explain the principles of the disclosure and the practical application and to enable others or ordinary skill in the art to understand the disclosure for various implementations with various modifications as are suited to the particular use contemplated.

A number of implementations have been described for managing legacy data, and several others have been mentioned or suggested. Moreover, those skilled in the art will readily recognize that a variety of additions, deletions, modifications, and substitutions may be made to these implementations while still achieving legacy data management. Thus, the scope of the protected subject matter should be judged based on the following claims, which may capture one or more concepts of one or more implementations.

The invention claimed is:

1. A method for managing legacy data, the method comprising:
receiving a data request at a storage controller;
determining whether the data request is associated with legacy data of an external storage management system;
retrieving data from a local storage array if the data request is not associated with legacy data of an external storage management system;
requesting legacy data from the external storage management system if the data request is associated with data of the external storage management system, wherein requesting the legacy data comprises accessing a file object created by combining a set of meta-data detailing a linear progression of the legacy data and offsets associated with the legacy data, the meta-data indicating a protocol for accessing and receiving the legacy data from the external storage management system; and generating a response to the data request.

2. The method of claim 1, further comprising executing a management functionality of the storage controller on the legacy data of the external storage management system.

3. The method of claim 2, wherein the management functionality comprises forming a snapshot of the legacy data on the external storage management system.

4. The method of claim 1, further comprising:
receiving a data write request;
determining whether the write request is associated with legacy data in an external storage management system;
writing the data to a local storage array based on the data being associated with legacy data in an external storage management system.

5. The method of claim 4, further comprising updating meta-data regarding the location of the written data.

6. The method of claim 5, further comprising:
receiving a data request for the written data;
retrieving the written data from the local storage array; and
generating a data response.

7. A storage management system comprising:
at least one storage array; and
a storage controller coupled to the storage array, the storage controller adapted to:
receive a data request from a server,
determine whether the data request is associated with legacy data of an external storage management system,
retrieve data from one of the local storage arrays if the data request is not associated with legacy data of an external storage management system,
request legacy data from the external storage management system if the data request is associated with data of the external storage management system, wherein the request comprises a request for a file object created by combining a set of meta-data detailing a linear progression of the legacy data and offsets associated with the legacy data, the meta-data indicating a protocol for accessing and receiving the legacy data from the external storage management system, and
generate a response to the data request.

8. The storage management system of claim 7, wherein the storage controller is further adapted to execute a management functionality on the legacy data of the external storage management system.

9. The storage management system of claim 8, wherein the management functionality comprises forming a snapshot of the legacy data on the external storage management system.

10. The storage management system of claim 7, wherein the storage controller is further adapted to:
receive a data write request;
determine whether the write request is associated with legacy data in an external storage management system;
write the data to a local storage array based on the data being associated with legacy data in an external storage management system.

11. The storage management system of claim 10, wherein the storage controller is further adapted to update meta-data regarding the location of the written data.

12. The storage management system of claim 11, wherein the storage controller is further adapted to:
receive a data request for the written data;
retrieve the written data from the local storage array; and
generate a data response.

13. A computer program product for managing legacy data, the computer program product comprising:
a computer readable storage memory;
first program instructions to determine whether a data request from a server has been received and whether the data request is associated with legacy data of an external storage management system;
second program instructions to retrieve data from a local storage array if the data request is not associated with legacy data of an external storage management system;
third program instructions to request legacy data from the external storage management system if the data request is associated with data of the external storage management system, wherein the request comprises a request for a file object created by combining a set of meta-data detailing a linear progression of the legacy data and offsets associated with the legacy data, the meta-data indicating a protocol for accessing and receiving the legacy data from the external storage management system; and
fourth program instructions to generate a response to the data request;
wherein said first, second, third and fourth program instructions are stored on said computer readable storage medium.

14. The computer program product of claim 13, wherein the second program instructions are further adapted to execute a management functionality on the legacy data of the external storage management system.

15. The computer program product of claim 14, wherein the management functionality comprises forming a snapshot of the legacy data on the external storage management system.

16. The computer program product of claim 13, wherein the first program instructions are further adapted to determine whether a data write request has been received and whether the write request is associated with legacy data in an external storage management system, and the second program instructions are further adapted to write the data to a local storage array based on the data being associated with legacy data in an external storage management system.

17. The computer program product of claim 16, wherein the second program instructions are further adapted to update meta-data regarding the location of the written data.

18. The computer program product of claim 17, wherein the first program instructions are further adapted to determine whether a data request for the written data has been received, the second program instructions are further operable to retrieve the written data from the local storage array, and the third program instructions are further operable to generate a data response.

19. A method for managing legacy data, the method comprising:
receiving a data request at a storage controller;
determining whether the data request is associated with legacy data of an external storage management system;
retrieving data from a local storage array if the data request is not associated with legacy data of an external storage management system;
requesting legacy data from an external storage management system if the data request is associated with data of an external storage management system, wherein requesting legacy data from the external storage management system comprises accessing a file object created by combining a set of meta-data detailing a linear progression of the legacy data and offsets associated with the legacy data, the meta-data indicating a protocol for accessing and receiving the legacy data from the external storage management system;
generating a response to the data request;
receiving a data write request;
determining whether the write request is associated with legacy data in the external storage management system;
writing the data to a local storage array based on the data being associated with legacy data in the external storage management system;
updating the meta-data regarding the location of the written data;
receiving a data request for the written data;
retrieving the written data from the local storage array; and
generating a data response.

* * * * *